(12) United States Patent
Asadi et al.

(10) Patent No.: US 12,456,526 B2
(45) Date of Patent: Oct. 28, 2025

(54) IN-NAND READ THRESHOLD VOLTAGE SEARCH SYSTEM AND METHOD

(71) Applicant: SK hynix Inc, Gyeonggi-do (KR)

(72) Inventors: Meysam Asadi, San Jose, CA (US); Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 217 days.

(21) Appl. No.: 18/514,174

(22) Filed: Nov. 20, 2023

(65) Prior Publication Data

US 2025/0166712 A1 May 22, 2025

(51) Int. Cl.
 *G11C 7/00* (2006.01)
 *G11C 16/26* (2006.01)
 *G11C 16/34* (2006.01)

(52) U.S. Cl.
 CPC .......... *G11C 16/26* (2013.01); *G11C 16/3404* (2013.01)

(58) Field of Classification Search
 CPC ....... G11C 7/1051; G11C 7/22; G11C 7/1072; G11C 7/1006; G11C 7/1066
 USPC ...................................................... 365/189.15
 See application file for complete search history.

(56) References Cited

U.S. PATENT DOCUMENTS

| | | | |
|---|---|---|---|
| 2020/0013471 A1 | 1/2020 | Cohen et al. | |
| 2020/0183592 A1 | 6/2020 | Lim | |
| 2020/0183614 A1* | 6/2020 | Kim | G06F 12/0607 |
| 2023/0035983 A1* | 2/2023 | Wang | G11C 29/021 |

* cited by examiner

*Primary Examiner* — Son T Dinh
(74) *Attorney, Agent, or Firm* — IP & T GROUP LLP

(57) ABSTRACT

A system and a method for searching for an optimal read threshold voltage. A memory device transfers to a controller only needed information (i.e., count formation) for each read, instead of transferring all the read data. The memory device includes: a pattern counter configured to: receive, from a memory cell, read data item, among multiple data items, corresponding to a read request; count, from the read data item, the number of cells reading as a particular value in multiple voltage level regions corresponding to multiple patterns for multiple pages among the plurality of pages, to generate count information; and provide the count information to the controller.

20 Claims, 9 Drawing Sheets

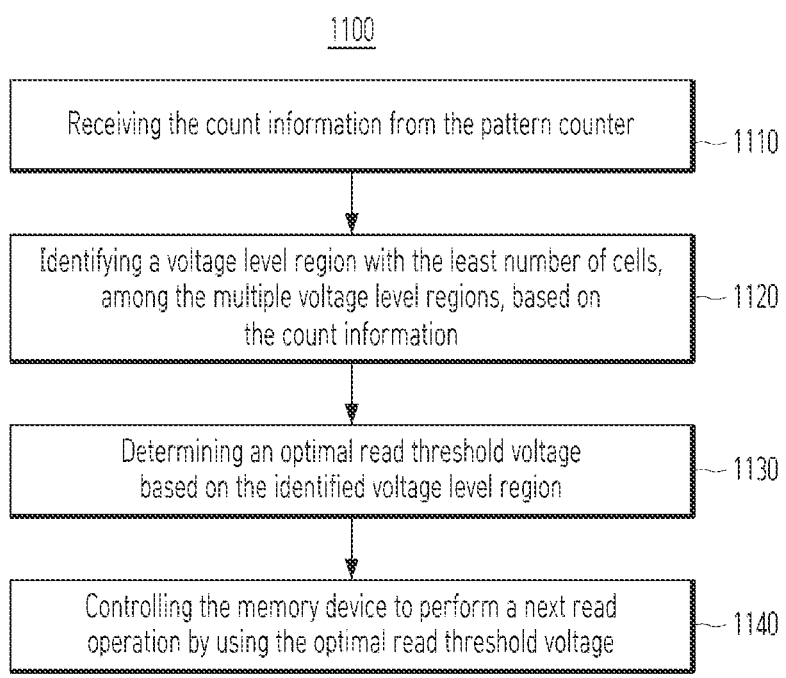

IN-NAND READ THRESHOLD VOLTAGE SEARCH SYSTEM AND METHOD

BACKGROUND

1. Field

Embodiments of the present disclosure relate to a scheme for searching for a read threshold voltage in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may determine an optimal read threshold voltage among read threshold voltages according to various schemes.

SUMMARY

Aspects of the present invention include a system and a method for searching for an optimal read threshold voltage capable of reducing an amount of information transferred for each read and transfer delay.

In one aspect, a memory system includes a controller configured to generate a read request and a memory device. The memory device includes: at least one memory cell including a plurality of pages configured to store multiple data items; and a pattern counter configured to: receive, from the memory cell, a read data item, among the multiple data items, corresponding to the read request; count, from the read data item, the number of cells reading as a particular value in multiple voltage level regions corresponding to multiple patterns for multiple pages among the plurality of pages, to generate count information; and provide the count information to the controller. The controller is configured to: receive the count information from the pattern counter; identify a voltage level region with the least number of cells, among the multiple voltage level regions, based on the count information; determine an optimal read threshold voltage based on the identified voltage level region; and control the memory device to perform a next read operation by using the optimal read threshold voltage.

In another aspect, a method operates a memory system including a memory device including at least one memory cell having a plurality of pages and a controller. The method includes: receiving, by a pattern counter of the memory device, from the memory cell, a read data item, among multiple data items, corresponding to a read request from the controller; counting, by the pattern counter, from the read data item, the number of cells reading as a particular value in multiple voltage level regions corresponding to multiple patterns for multiple pages among the plurality of pages, to generate count information; providing, by the pattern counter, the count information to the controller; receiving, by the controller, the count information from the pattern counter; identifying, by the controller, a voltage level region with the least number of cells, among the multiple voltage level regions, based on the count information; determining, by the controller, an optimal read threshold voltage based on the identified voltage level region; and controlling, by the controller, the memory device to perform a next read operation by using the optimal read threshold voltage.

Additional aspects of the present invention will become apparent from the following description.

BRIEF DESCRIPTION OF THE DRAWINGS

FIG. 11 is a flowchart illustrating an operation of a controller in accordance with another embodiment of the present invention.

DETAILED DESCRIPTION

Figure 1:
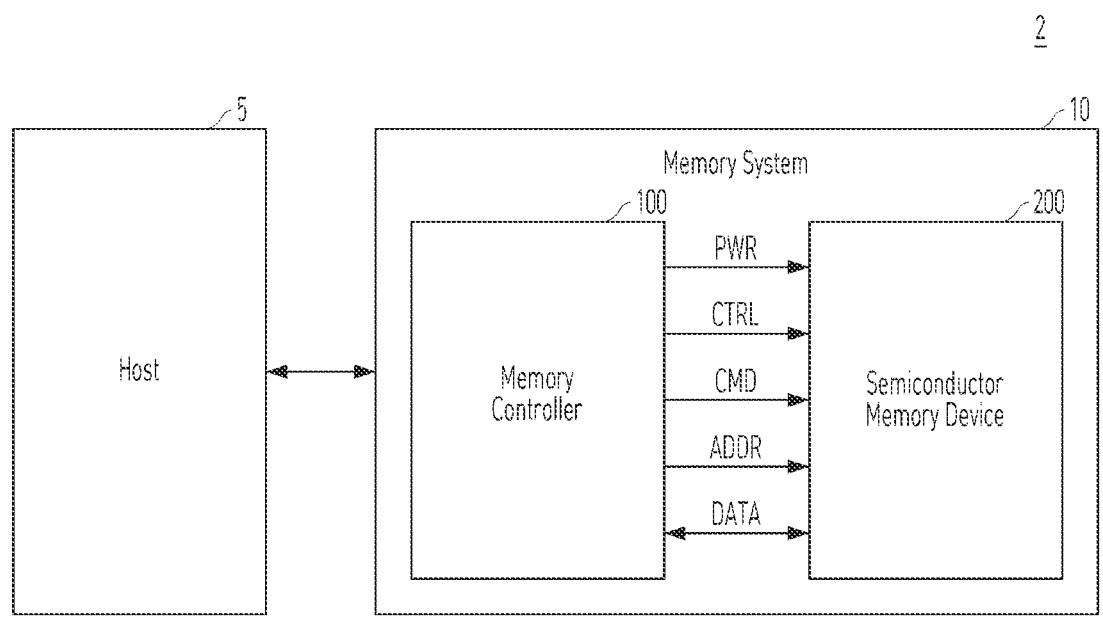
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, for example including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or as a circuit component that is manufactured or pre-configured or pre-programmed to perform the task. As used herein, the term 'processor' or the like refers to one or more devices, circuits, and/or processing cores suitable for processing data, such as computer program instructions.

The methods, processes, and/or operations described herein may be performed by code or instructions to be executed for example by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing any one of the methods herein.

If implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any specific embodiment. The present invention encompasses numerous alternatives, modifications and equivalents. Numerous specific details are set forth in the following description in order to provide a thorough understanding of the present invention. These details are provided for the purpose of example; the present invention may be practiced without some or all of these specific details. For clarity, technical material that is known in technical fields related to the present invention may not been described in detail.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may be an electronic device such as for example a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may be a portable electronic device such as for example a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive through input/output lines a command CMD, an address ADDR and data DATA. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. In one embodiment of the invention, where the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
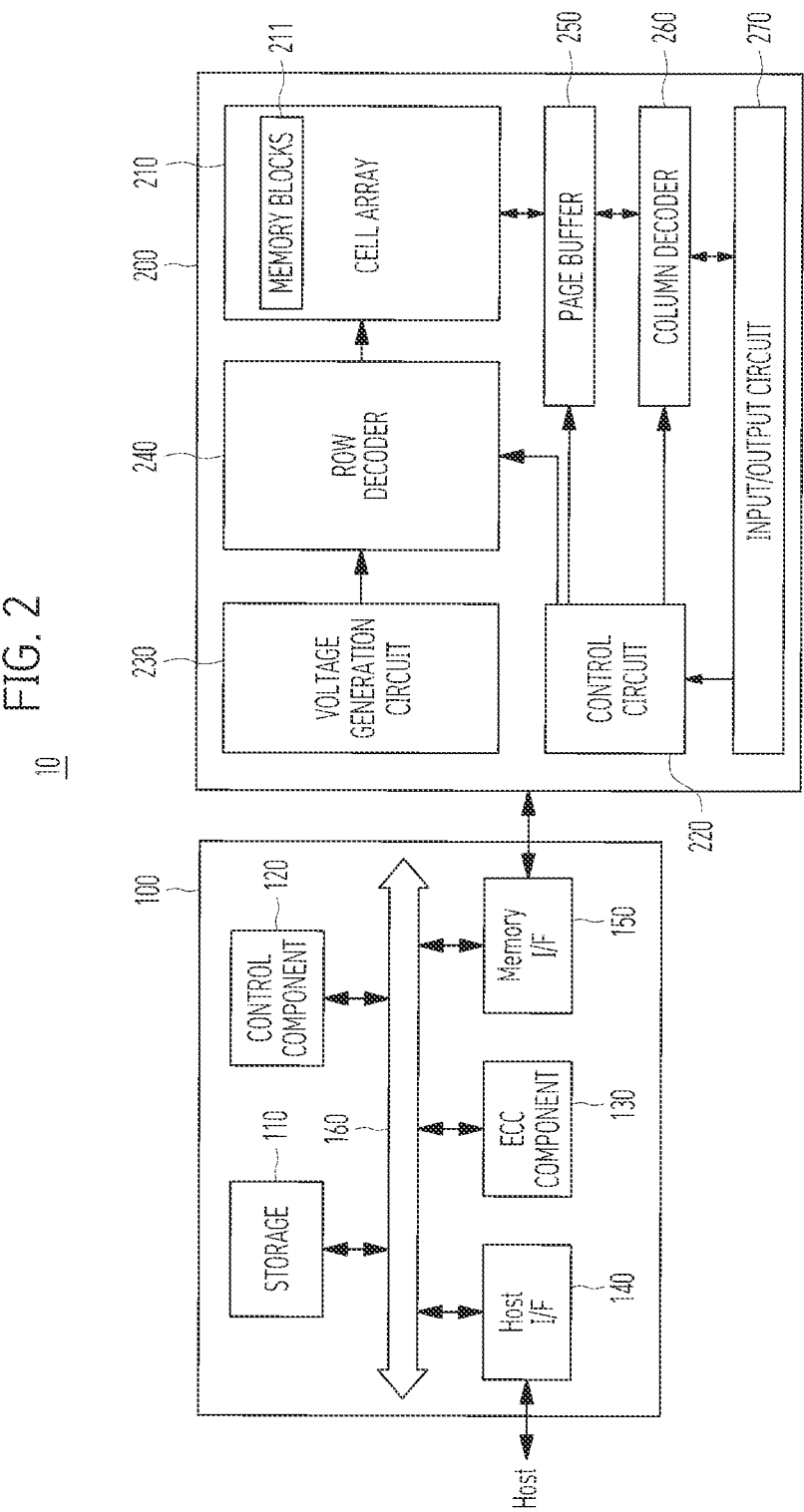
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., a request from host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as for example a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as for example a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and storage 110 may store data for driving the memory system 10 and the controller 100. For example, when the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware or other program instructions, which can be referred to as a flash translation layer (FTL), to control operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. In one embodiment, the ECC component 130 may not correct error bits when the number of the error bits is greater than or equal to a threshold number of correctable error bits, but instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices suitable for error correction operation.

The host interface 140 may communicate with the host device through one or more of various communication standards or interfaces such as for example a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. In one embodiment where the memory device 200 is a flash memory such as a NAND flash memory, the memory interface 150 may generate control signals for the memory and process data under the control of the control component 120.

The memory device 200 as shown for example in FIG. 2 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform program, read, or erase operations of the memory cell array 210. The control circuit 220 may control the peripheral circuit.

The voltage generation circuit 230 may generate operational voltages of various levels. For example, in an erase operation, the voltage generation circuit 230 may generate operational voltages of various levels such as for example an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
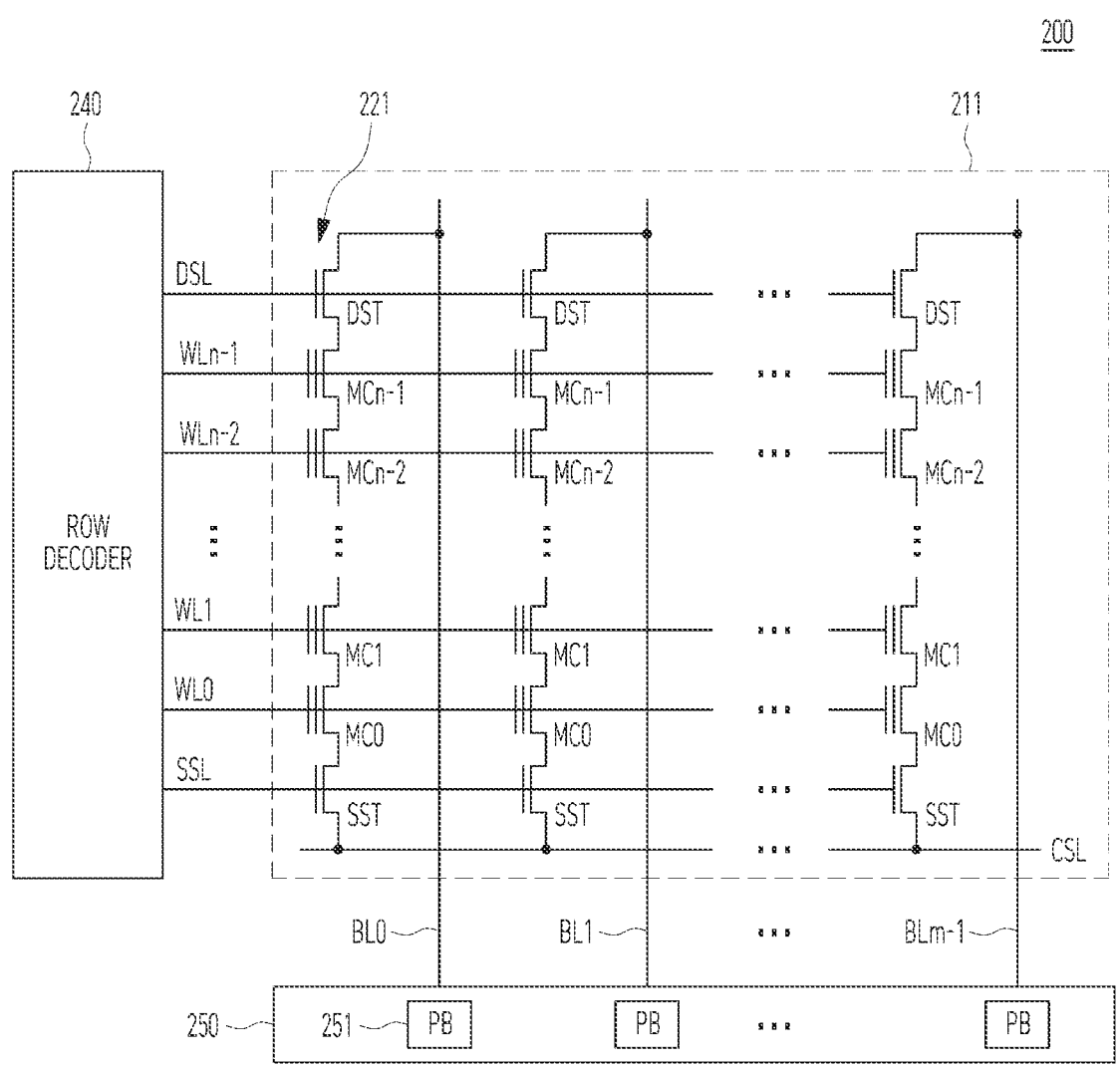
FIG. 3 is a circuit diagram illustrating a memory block of a memory device in accordance with another embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or may transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In various embodiments of the present invention, the memory blocks 211 may include a NAND-type flash memory cell. However, the memory blocks 211 are not limited to such cell type, and may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
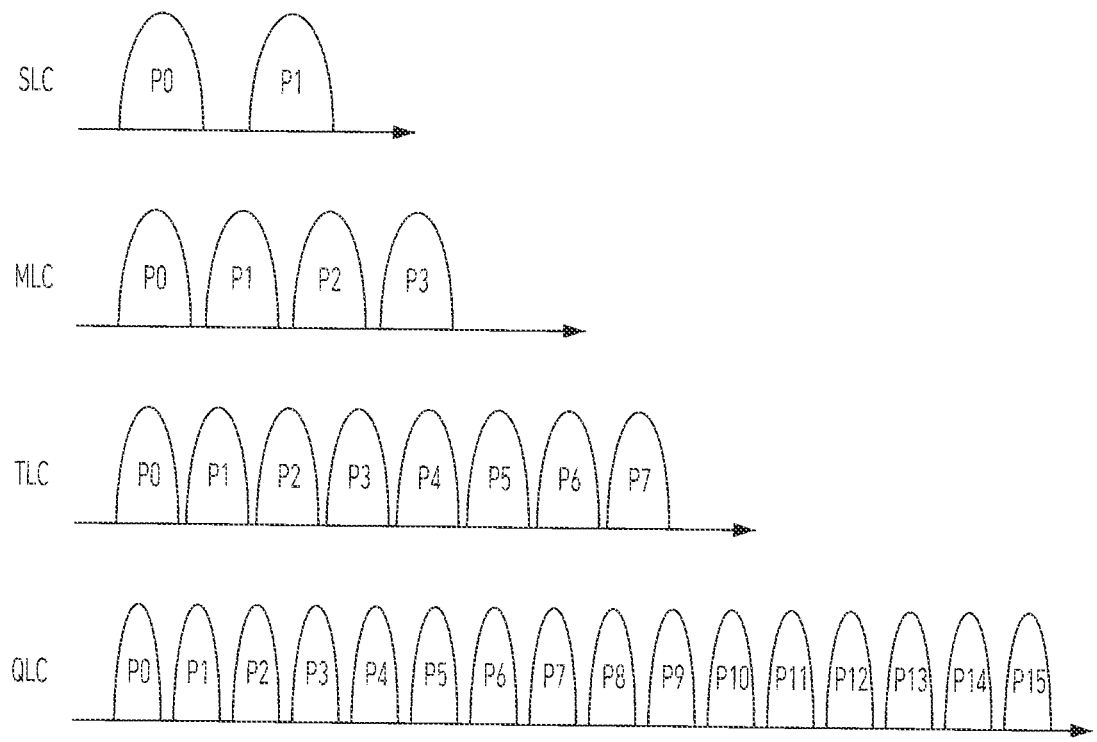
FIG. 4 is a diagram illustrating distributions of states for different types of cells of a memory device in accordance with another embodiment of the present invention.

FIG. 4 is a diagram illustrating distributions of states or program voltage (PV) levels for different types of cells of a memory device.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is addressed. During a read operation, the word line is again addressed, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed for example using a coding scheme (e.g., Gray coding) in order to increase the capacity of the memory system 10 such as SSD.

Figure 5A:
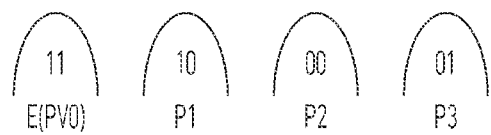
FIG. 5A is a diagram illustrating an example of Gray coding for a multi-level cell (MLC) in accordance with another embodiment of the present invention.

FIG. 5A is a diagram illustrating an example of coding for a multi-level cell (MLC).

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
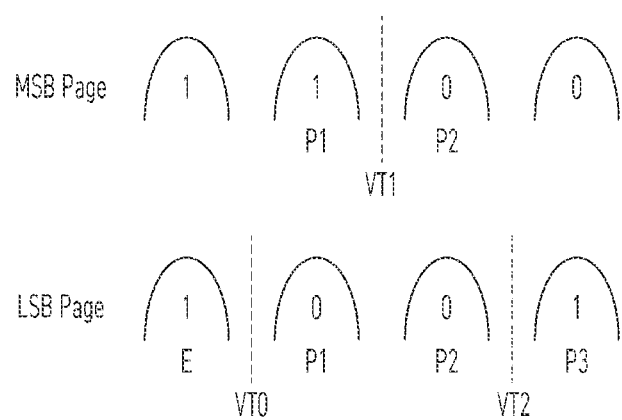
FIG. 5B is a diagram illustrating state distributions for pages of a multi-level cell (MLC) in accordance with another embodiment of the present invention.

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Figure 6A:
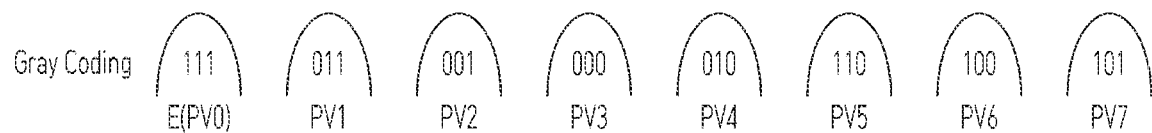
FIG. 6A is a diagram illustrating one example of Gray coding for a triple-level cell (TLC) in accordance with another embodiment of the present invention.

FIG. 6A is a diagram illustrating an example of Gray coding for a triple-level cell (TLC).

Referring to FIG. 6A, a TLC may be programmed using Gray coding. A TLC may have 8 program states, which include an erased state E (or PV0) and a first program state PV1 to a seventh program state PV7. The erased state E (or PV0) may correspond to "111." The first program state PV1 may correspond to "011." The second program state PV2 may correspond to "001." The third program state PV3 may correspond to "000." The fourth program state PV4 may correspond to "010." The fifth program state PV5 may correspond to "110." The sixth program state PV6 may correspond to "100." The seventh program state PV7 may correspond to "101."

Figure 6B:
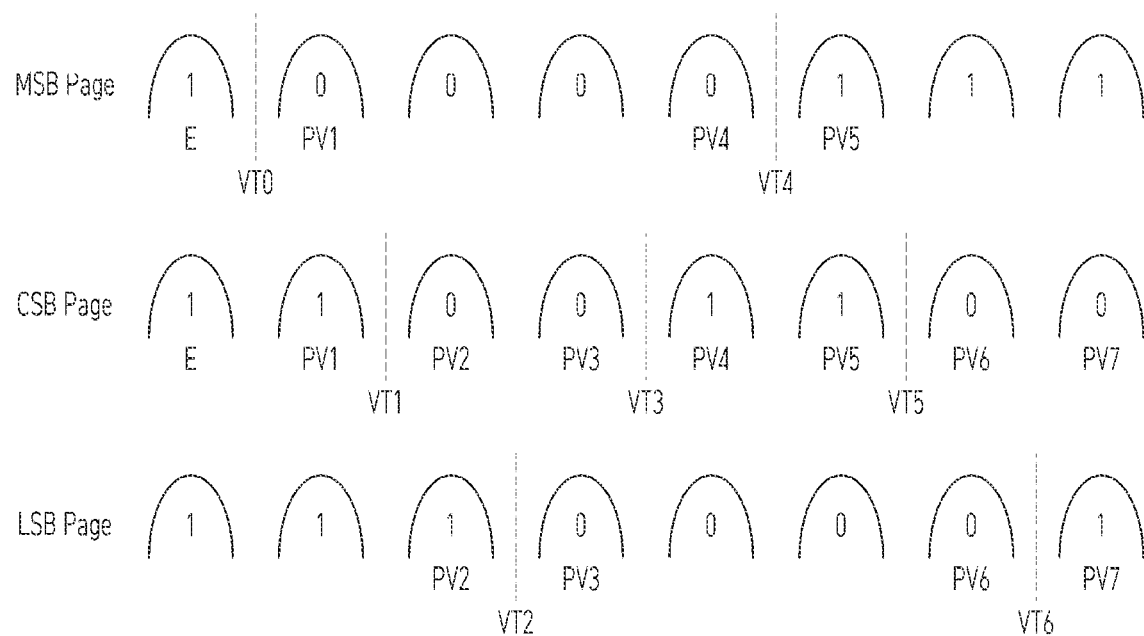
FIG. 6B is a diagram illustrating state distributions for pages of a triple-level cell (TLC) in accordance with another embodiment of the present invention.

In the TLC, as shown in FIG. 6B, there are 3 types of pages including LSB, CSB and MSB pages. 2 or 3 thresholds may be applied in order to retrieve data from the TLC. For an MSB page, 2 thresholds include a threshold value VT0 that distinguishes between an erase state E and a first program state PV1 and a threshold value VT4 that distinguishes between a fourth program state PV4 and a fifth program state PV5. For a CSB page, 3 thresholds include VT1, VT3 and VT5. VT1 distinguishes between a first program state PV1 and a second program state PV2. VT3 distinguishes between a third program state PV3 and the fourth program state PV4. VT5 distinguishes between the fourth program state PV5 and the sixth program state PV6. For an LSB page, 2 thresholds include VT2 and VT6. VT2 distinguishes between the second program state PV2 and the third program state PV3. VT6 distinguishes between the sixth program state PV6 and a seventh program state PV7.

After a memory array including a plurality of memory cells is programmed as described in FIGS. 5A and 6A, when a read operation is performed on the memory array using a reference voltage such as a read threshold voltage (also called "read voltage level" or "read threshold"), the electrical charge levels of the memory cells (e.g., threshold voltage levels of transistors of memory cells) are compared to one or more reference voltages to determine the state of individual memory cells. When a specific read threshold is applied to the memory array, those memory cells that have threshold voltage levels higher than the reference voltage are turned on and detected as "on" cell, whereas those memory cells that have threshold voltage levels lower than the reference voltage are turned off and detected as "off" cell, for example. Therefore, each read threshold is arranged between neighboring threshold voltage distribution windows corresponding to different programmed states so that each read threshold can distinguish such programmed states by turning on or off the memory cell transistors.

When a read operation is performed on memory cells in a data storage device using MLC technology, the threshold voltage levels of the memory cells are compared to more than one read threshold level to determine the state of individual memory cells. Read errors can be caused by distorted or overlapped threshold voltage distributions. An ideal memory cell threshold voltage distribution can be significantly distorted or overlapped due to, e.g., program and erase (P/E) cycles, cell-to-cell interference, and/or data retention errors. For example, as program/erase cycles increase, the margin between neighboring threshold voltage distributions of different programmed states decreases and eventually the distributions overlap. As a result, the memory cells with threshold voltages that fall within the overlapping region of the neighboring distributions may be read as being programmed to a value other than the original targeted value and thus cause read errors. Such read errors may be managed in many situations by using error correction codes (ECC). When the number of bit errors on a read operation exceeds the ECC correction capability of the data storage, the read operation using a set read threshold voltage fails. The set read threshold voltage may be a previously used read threshold voltage (i.e., a historical read threshold voltage). The historical read threshold voltage may be the read threshold voltage used in the last successful decoding, that is, a read voltage used in a read-passed read operation performed before read retry operations. When the read operation using the set read threshold voltage failed, the controller 120 may control an error recovery algorithm such as for example the algorithm shown in FIG. 7.

Figure 7:
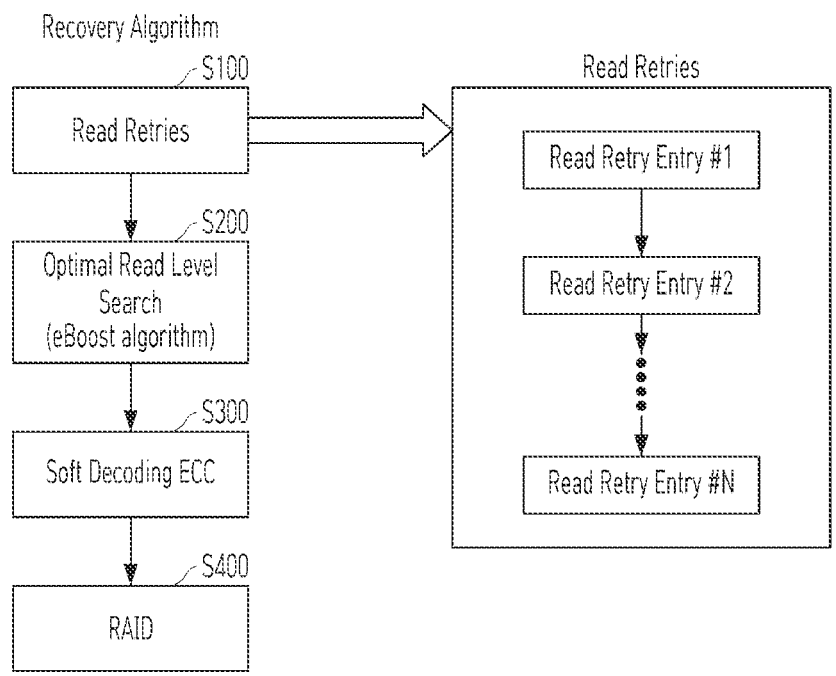
FIG. 7 is a diagram illustrating a flow of an error recovery algorithm in a memory system.

Referring to FIG. 7, a controller (such as control component 120 in FIG. 2) may perform one or more read retry operations for the memory cells using one or more read threshold voltages applied in a set order (S100). For example, the read threshold voltages may include N (e.g., N is 5 or 10) read threshold voltages (or read voltage levels) including a first read threshold voltage to an Nth read threshold voltage. The first read threshold voltage may be a previously used read threshold voltage (i.e., a history (historical) read threshold voltage). The historical read threshold voltage may be the read threshold voltage used in the last successful decoding, that is, a read voltage used in a read-passed read operation performed before the read retry operations. The controller 120 may perform the read retry operations until it is determined that decoding associated with a corresponding read retry operation is successful.

When all read retry operations using the read threshold voltages have failed, controller 120 may perform additional recovery operations. For example, the additional recovery operations may include an optimal read threshold voltage search (S200), a soft decoding using an error correction code (ECC) (S300) and/or a redundant array of independent disks (RAID) recovery (S400).

As noted above, in existing memory systems (e.g., a solid state drive (SSD)), searching for an optimal read voltage threshold or threshold voltage (Vt) is required if all/some of the pre-defined threshold voltages (called hard read retry (HRR)) lead to decoding failure. For the optimal read threshold voltage search, a controller (e.g., firmware (FW)) performs an optimal read algorithm (often referred to as an eBoost algorithm). The eBoost algorithm is accurate enough to provide high reliability. However, it is very costly since it needs additional reads to estimate distributions of all threshold voltage levels and to approximate Gaussian hyper parameters for each level distribution. Read data for each eBoost read is transferred from a memory device to the controller, which causes additional transfer delay for each read. This will increase read collision with other host read(s) and reduce the overall performance of the memory system. Accordingly, embodiments of the present invention provide a scheme for an optimal read threshold voltage search capable of reducing an amount of information transferred for each read and the transfer delay. Embodiments of the present inventions provide a non-blocking Vt search scheme in which the only needed information (i.e., count formation) for each eBoost read is transferred to a controller from a memory device, instead of transferring all the read data. Here, non-blocking refers to the ability of a program or system to continue execution without being blocked or held by other program or system calls. This scheme can reduce unnecessary transfer time for all the additional reads and improve the overall performance/power of the memory system.

Figure 8:
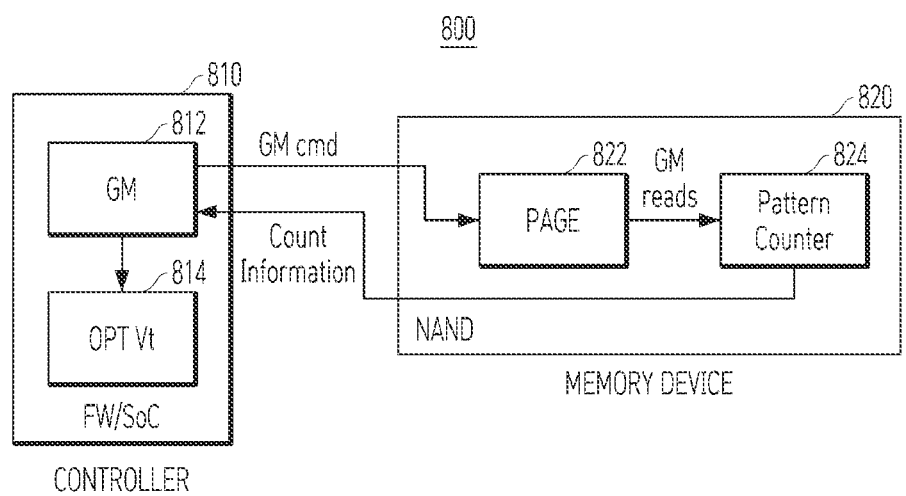
FIG. 8 is a diagram illustrating a memory system including a pattern counter in accordance with another embodiment of the present invention.

FIG. 8 is a diagram illustrating a memory system 800 in accordance with one embodiment of the present invention.

Referring to FIG. 8, the memory system 800 may include a controller 810 and a memory device 820. As shown, the controller 810 may include a Gaussian Model (GM) module 812 and an optimal read threshold voltage (OPT Vt) determiner 814, and the memory device 820 may include at least one memory cell 822 and a pattern counter 824. Further, the controller 810 and the memory device 820 may include other elements such as elements shown in FIGS. 1 and 2. That is, the controller 810 and the memory device 820 may be a memory system corresponding to the memory system 10 including the controller 100 and the memory device 200 shown in FIGS. 1 and 2. In some embodiments, the controller 810 may be implemented with firmware and system on chip (SoC), and the memory device 820 may be implemented with a non-volatile memory such as a NAND flash memory.

The controller 810 may generate a command associated with an eBoost algorithm for searching for an optimal read threshold voltage. In some embodiments, the command may be referred to as a Gaussian model (GM) command, as the eBoost algorithm finds an optimal read threshold by estimating a region of each read threshold voltage level as a Gaussian model. The eBoost algorithm may be triggered if read operations using all/some of the pre-defined read threshold voltages lead to decoding failure. That is, the GM command may be a kind of a read request which is generated in response to the triggering of the eBoost algorithm. The GM command may be provided to the memory cell 822 of the memory device 820.

The memory cell 822 may output read data item among the multiple data items, which is data read corresponding to the read request (i.e., GM command). The memory cell 822 may be implemented with NAND flash memory cells, each cell including a plurality of pages for storing multiple data items. The memory cells are arranged in an array of rows and columns such as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is addressed. During a read operation, the word line is again addressed, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 800 such as an SSD. Operations for the memory cell 822 may be controlled by a control circuit (such as control circuit 220 in FIG. 2) and other elements as shown in FIG. 2.

In some embodiments, the memory cell 822 may output read data items corresponding to multiple reads in response to the GM command. For example, when the memory cell is implemented with TLC, read data items for 20 reads may be output to estimate distributions of all read threshold voltage levels.

The pattern counter 824 may receive at least one read data item from the memory cell 822. The pattern counter 824 may count, from the read data item, the number of cells reading as a particular value (e.g., one (1)) in multiple voltage level regions corresponding to multiple patterns for multiple pages among the plurality of pages. The pattern counter 824 may generate count information based on the counting operation and provide the count information to the GM module 810 of the controller 810.

A counting operation of the pattern counter 824 is described with reference to FIG. 9.

Figure 9:
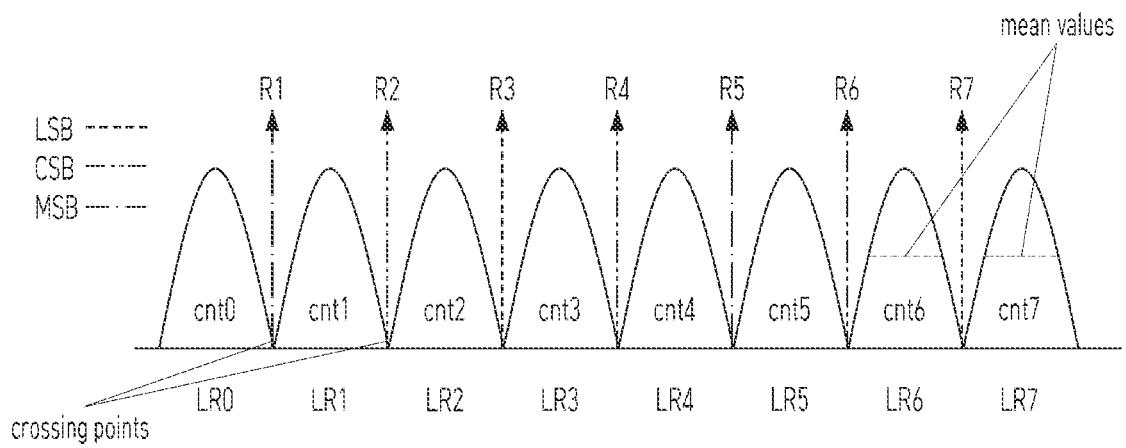
FIG. 9 is a diagram illustrating a counting operation of a pattern counter in accordance with another embodiment of the present invention.

FIG. 9 illustrates a typical TLC read threshold voltage (Vt) histogram where an X-axis represents distributions (or regions) of read threshold voltage levels and a Y-axis represents the number of cells. The reference characters R1-R7 represent the corresponding read voltage for each voltage level distribution according to LSB, CSB, and MSB reference read levels (denoted by the legend on the left side).

The pattern counter 824 may perform a counting operation for reads from TLC memory cells according to particular patterns.

For the read of MSB page, the pattern counter 824 may obtain the number of cells reading as a particular value (e.g., cells reading as 1s) in the multiple voltage level regions according to the pattern (R1, R5) associated with MSB pages. Using R1, the number of cells reading 1s in the voltage level region LR0 are obtained as the count value (cnt0). Using R5, the total number of cells reading 1s in the voltage level regions LR0-LR4 are obtained. Further, the total number of cells reading 1s in the voltage level regions LR0-LR7 are obtained. Then, using this information and by subtracting the measured counts from the different voltage level regions, the pattern counter 824 may generate the following count information corresponding to the pattern (R1, R5): MSB_count_info=(cnt0, cnt1+cnt2+cnt3+cnt4, cnt5+cnt6+cnt7). In these count equations provided for MSB, we assume that the length of codeword is known. Let us call it n. There is an additional equation which is cnt0+cnt1+cnt2+cnt3+cnt4+cnt5+cnt6+cnt7=n. From R1, the number of cnt0 is obtained. From R5, the equation cnt0+cnt1+cnt2+cnt3+cnt4 is obtained. By subtracting the equation cnt0+cnt1+cnt2+cnt3+cnt4 (related to R5) from the additional equation n (assuming known codeword length), the sum of cnt5+cnt6+cnt7 is obtained.

In some embodiments, the number of cells reading as the particular value may indicate the number of ones (1s) bits in each voltage level region. The count information may include first count information (cnt0) indicating the number of cells in the first voltage level region LR0, second count information (cnt1+cnt2+cnt3+cnt4) indicating the number of cells in a range of the second to fifth voltage level regions LR1-LR4, and third count information (cnt5+cnt6+cnt7) indicating the number of cells in a range of the sixth to eighth voltage level regions LR5-LR7.

For read of CSB page, the pattern counter 824 may obtain the number of cells in multiple voltage level regions according to the pattern (R2, R4, R6) associated with CSB pages. Using R2, the total number of cells in the voltage level regions LR0-LR1 are obtained as the count value (cnt0+cnt1). Using R4, the total number of cells in the voltage level regions LR0-LR3 are obtained. Using R6, the total number of cells in the voltage level regions LR0-LR5 are obtained. Further, the total number of cells in the voltage level regions LR0-LR7 are obtained. Then, using this information and by subtracting the measured counts from the different voltage level regions, the pattern counter 824 may generate the following count information corresponding to the pattern (R2, R4, R6): CSB_count_info=(cnt0+cnt1, cnt2+cnt3, cnt4+cnt5, cnt6+cnt7). Similar to MSB, by subtracting the sum of the equations cnt0+cnt1, cnt2+cnt3, and cnt4+cnt5 from the additional equation n, the sum of cnt6+cnt7 is obtained.

In some embodiments, the count information includes first count information (cnt0+cnt1) indicating the number of cells in a range of the first and second voltage level regions LR0-LR1, second count information (cnt2+cnt3) indicating the number of cells in a range of the third and fourth voltage level regions LR2-LR3, third count information (cnt4+cnt5) indicating the number of cells in a range of the fifth and sixth voltage level regions LR4-LR5, and fourth count information (cnt6+cnt7) indicating the number of cells in a range of the seventh and eighth voltage level regions LR6-LR7.

For read of LSB page, the pattern counter 824 may obtain the number of cells in multiple voltage level regions according to the pattern (R3, R7) associated with LSB pages. Using R3, the total number of cells in the voltage level regions LR0-LR2 are obtained as the count value (cnt0+cnt1+cnt2). Using R7, the total number of cells in the voltage level regions LR0, LR1, LR2, LR3, LR4, LR5, LR6 are obtained. Further, the number of cells in the voltage level region LR7 are obtained. Then, using this information and by subtracting the measured counts from the different voltage level regions the pattern counter 824 may generate the following count information: CSB_count_info=(cnt0+cnt1+cnt2, cnt3+cnt4+cnt5+cnt6, cnt7). Similar to MSB, by subtracting the sum of the equations cnt0+cnt1+cnt2, and cnt3+cnt4+cnt5+cnt6 from the additional equation n, the count info. of cnt7 is obtained.

In some embodiments, the count information includes first count information (cnt0+cnt1+cnt2) indicating the number of cells in a range of the first to third voltage level regions LR0-LR2, second count information (cnt3+cnt4+cnt5+cnt6) indicating the number of cells in a range of the fourth to seventh voltage level regions LR3-LR6, and third count information (cnt7) indicating the number of cells in the eighth voltage level region LR7.

Referring back to FIG. 8, for each read request, the pattern counter 824 may send count information for all LSB, CSB and MSB pages to the GM module 812 of the controller 810. The GM module 812 may receive the count information from the pattern counter 824, and identify a voltage level region with the least number of cells, among the multiple voltage level regions, based on the count information. The GM module 812 can find optimal Vt as long as the cell counts for each level region is available.

The GM module 812 may estimate a mean value in each of the multiple voltage level regions based on the count information, and estimate crossing points between neighboring voltage level regions. In some embodiments, the GM module 812 may estimate crossing points between probability density function (pdf) of two neighboring voltage level regions. For example, the GM module 812 may estimate the crossing points of two neighboring voltage level regions using estimated mean values of the neighboring voltage level regions neighboring voltage level regions and a fixed variance.

The optimal read threshold voltage determiner 814 may determine an optimal read threshold voltage based on the identified voltage level region by the GM module 812. In some embodiments, the optimal read voltage determiner 814 may determine, as the optimal read threshold voltage, a voltage level at a crossing point between the identified voltage level region and a neighbor voltage level region thereof, among the crossing points. Further, the optimal read voltage determiner 814 may control the memory device 820 to perform a next read operation by using the optimal read threshold voltage.

Figure 10:
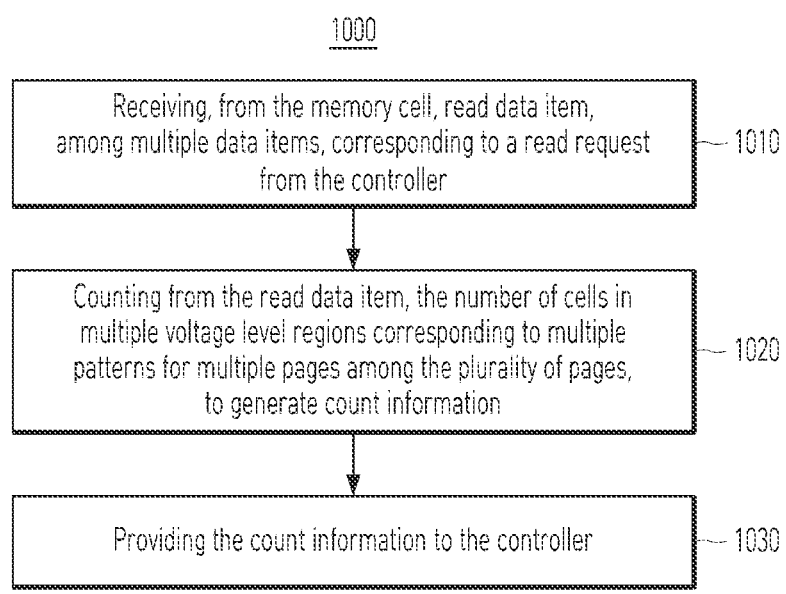
FIG. 10 is a flowchart illustrating an operation of a pattern counter in accordance with another embodiment of the present invention.

FIG. 10 is a flowchart illustrating an operation 1000 of a pattern counter 824 of the memory device 820 in accordance with another embodiment of the present invention.

Referring to FIG. 10, the method 1000 includes, at operation 1010, receiving, from the memory cell 822, a read data item among multiple data items, corresponding to a read request from a controller. The method 1000 includes, at operation 1020, counting, from the read data item, the number of cells reading as a particular value in multiple voltage level regions corresponding to multiple patterns for multiple pages among the plurality of pages, to generate count information. The method 1000 includes, at operation 1030, providing the count information to the controller.

In some embodiments, the number of cells reading as the particular value indicate the number of ones (1s) bits in each voltage level region.

In some embodiments, the plurality of pages includes a most significant bit (MSB) page, a center significant bit (CSB) page and a least significant bit (LSB) page, and the multiple voltage level regions include first to eighth voltage level regions.

In some embodiments, the multiple patterns include a first pattern for the MSB page. The count information includes first count information indicating the number of cells in the first voltage level region, second count information indicating the number of cells in a range of the second to fifth voltage level regions, and third count information indicating the number of cells in a range of the sixth to eighth voltage level regions.

In some embodiments, the multiple patterns include a second pattern for the CSB page. The count information includes first count information indicating the number of cells in a range of the first and second voltage level regions, second count information indicating the number of cells in a range of the third and fourth voltage level regions, third count information indicating the number of cells in a range of the fifth and sixth voltage level regions, and fourth count information indicating the number of cells in a range of the seventh and eighth voltage level regions.

In some embodiments, the multiple patterns include a third pattern for the LSB page. The count information includes first count information indicating the number of cells in a range of the first to third voltage level regions, second count information indicating the number of cells in a range of the fourth to seventh voltage level regions, and third count information indicating the number of cells in the eighth voltage level region.

In some embodiments, the multiple patterns include a first pattern for the MSB page, a second pattern for the CSB page, and a third pattern for the LSB page. The count information includes first information, second information and third information. The first information includes first count information indicating the number of cells in the first voltage level region, second count information indicating the number of cells in a range of the second to fifth voltage level regions, and third count information indicating the number of cells in a range of the sixth to eighth voltage level regions. The second information includes fourth count information indicating the number of cells in a range of the first and second voltage level regions, fifth count information indicating the number of cells in a range of the third and fourth voltage level regions, sixth count information indicating the number of cells in a range of the fifth and sixth voltage level regions, and seventh count information indicating the number of cells in a range of the seventh and eighth voltage level regions. The third information includes eighth count information indicating the number of cells in a range of the first to third voltage level regions, ninth count information indicating the number of cells in a range of the fourth to seventh voltage level regions, and tenth count information indicating the number of cells in the eighth voltage level region.

FIG. 11 is a flowchart illustrating an operation 1100 of a controller 810 in accordance with another embodiment of the present invention.

Referring to FIG. 11, the method 1100 includes, at operation 1110, receiving the count information from the pattern counter. The method 1100 includes, at operation 1120, identifying a voltage level region with the least number of cells, among the multiple voltage level regions, based on the count information. The method 1100 includes, at operation 1130, determining an optimal read threshold voltage based on the identified voltage level region. The method 1100 includes, at operation 1140, controlling the memory device to perform a next read operation by using the optimal read threshold voltage.

In some embodiments, the identifying of the voltage level region includes: estimating a mean value in each of the multiple voltage level regions based on the count information, and finding crossing points between neighboring voltage level regions.

In some embodiments, the determining of the optimal read threshold voltage includes: determining, as the optimal read threshold voltage, a voltage level at a crossing point between the identified voltage level region and a neighbor voltage level region thereof, among the crossing points.

In some embodiments, the finding of the crossing points includes finding crossing points between probability density function (pdf) of two neighboring voltage level regions.

In some embodiments, the finding of the crossing points includes estimating the crossing points of two neighboring voltage level regions using estimated mean values of the neighboring voltage level regions neighboring voltage level regions and a fixed variance.

As described above, embodiments provide a scheme for an optimal read threshold voltage search capable of reducing information for each read and reducing transfer delay. Embodiments of the present inventions provide a non-blocking Vt search scheme in which only count formation (few bytes of information) for each eBoost read is transferred to a controller from a memory device, instead of transferring all read data (very long sequence). This scheme can reduce unnecessary transfer time for all the additional reads and improve the overall performance/power of the memory system.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives of the disclosed embodiment. Furthermore, the disclosed embodiments may be combined to form additional embodiments.

What is claimed is:

1. A memory system comprising:
a controller configured to generate a read request; and
a memory device including:
at least one memory cell including a plurality of pages configured to store multiple data items; and
a pattern counter configured to:
receive, from the memory cell, a read data item, among the multiple data items, corresponding to the read request;
count, from the read data item, the number of cells reading as a particular value in multiple voltage level regions corresponding to multiple patterns for multiple pages among the plurality of pages, to generate count information; and
provide the count information to the controller,
wherein the controller is configured to:
receive the count information from the pattern counter;
identify a voltage level region with the least number of cells, among the multiple voltage level regions, based on the count information;
determine an optimal read threshold voltage based on the identified voltage level region; and
control the memory device to perform a next read operation by using the optimal read threshold voltage.

2. The memory system of claim 1, wherein the controller includes:
a Gaussian model (GM) module configured to estimate a mean value in each of the multiple voltage level regions based on the count information, and estimate crossing points between neighboring voltage level regions; and
an optimal read voltage determiner configured to determine, as the optimal read threshold voltage, a voltage level at a crossing point between the identified voltage level region and a neighbor voltage level region thereof, among the crossing points.

3. The memory system of claim 2, wherein the GM module estimates crossing points between probability density function (pdf) of two neighboring voltage level regions.

4. The memory system of claim 2, wherein the GM module estimates the crossing points of two neighboring voltage level regions using estimated mean values of the neighboring voltage level regions and a fixed variance.

5. The memory system of claim 1, wherein the number of cells reading as the particular value indicate the number of ones (1s) bits in each voltage level region.

6. The memory system of claim 5, wherein the plurality of pages includes a most significant bit (MSB) page, a center significant bit (CSB) page and a least significant bit (LSB) page, and
the multiple voltage level regions include first to eighth voltage level regions.

7. The memory system of claim 6, wherein the multiple patterns include a first pattern for the MSB page, and
the count information includes first count information indicating the number of cells in the first voltage level region, second count information indicating the number of cells in a range of the second to fifth voltage level regions, and third count information indicating the number of cells in a range of the sixth to eighth voltage level regions.

8. The memory system of claim 6, wherein the multiple patterns include a second pattern for the CSB page, and
the count information includes first count information indicating the number of cells in a range of the first and second voltage level regions, second count information indicating the number of cells in a range of the third and fourth voltage level regions, third count information indicating the number of cells in a range of the fifth and sixth voltage level regions, and fourth count information indicating the number of cells in a range of the seventh and eighth voltage level regions.

9. The memory system of claim 6, wherein the multiple patterns include a third pattern for the LSB page, and
the count information includes first count information indicating the number of cells in a range of the first to third voltage level regions, second count information indicating the number of cells in a range of the fourth to seventh voltage level regions, and third count information indicating the number of cells in the eighth voltage level region.

10. The memory system of claim 6, wherein the multiple patterns include a first pattern for the MSB page, a second pattern for the CSB page, and a third pattern for the LSB page, and
wherein the count information includes:
first information which includes first count information indicating the number of cells in the first voltage level region, second count information indicating the number of cells in a range of the second to fifth voltage level regions, and third count information indicating the number of cells in a range of the sixth to eighth voltage level regions;
second information which includes fourth count information indicating the number of cells in a range of the first and second voltage level regions, fifth count information indicating the number of cells in a range of the third and fourth voltage level regions, sixth count information indicating the number of cells in a range of the fifth and sixth voltage level regions, and seventh count information indicating the number of cells in a range of the seventh and eighth voltage level regions; and
third information which includes eighth count information indicating the number of cells in a range of the first to third voltage level regions, ninth count information indicating the number of cells in a range of the fourth to seventh voltage level regions, and tenth count information indicating the number of cells in the eighth voltage level region.

11. A method for operating a memory system including a memory device including at least one memory cell having a plurality of pages and a controller, the method comprising:
receiving, by a pattern counter of the memory device, from the memory cell, a read data item, among multiple data items, corresponding to a read request from the controller;
counting, by the pattern counter, from the read data item, the number of cells reading as a particular value in multiple voltage level regions corresponding to multiple patterns for multiple pages among the plurality of pages, to generate count information;
providing, by the pattern counter, the count information to the controller;
receiving, by the controller, the count information from the pattern counter;
identifying, by the controller, a voltage level region with the least number of cells, among the multiple voltage level regions, based on the count information;
determining, by the controller, an optimal read threshold voltage based on the identified voltage level region; and
controlling, by the controller, the memory device to perform a next read operation by using the optimal read threshold voltage.

12. The method of claim 11, wherein the identifying of the voltage level region includes: estimating a mean value in each of the multiple voltage level regions based on the count information, and finding crossing points between neighboring voltage level regions, and
wherein the determining of the optimal read threshold voltage includes: determining, as the optimal read threshold voltage, a voltage level at a crossing point between the identified voltage level region and a neighbor voltage level region thereof, among the crossing points.

13. The method of claim 12, wherein the finding of the crossing points includes finding crossing points between probability density function (pdf) of two neighboring voltage level regions.

14. The method of claim 12, wherein the finding of the crossing points includes estimating the crossing points of two neighboring voltage level regions using estimated mean values of the neighboring voltage level regions and a fixed variance.

15. The method of claim 11, wherein the number of cells reading as the particular value indicate the number of ones (1s) bits in each voltage level region.

16. The method of claim 15, wherein the plurality of pages includes a most significant bit (MSB) page, a center significant bit (CSB) page and a least significant bit (LSB) page, and
the multiple voltage level regions include first to eighth voltage level regions.

17. The method of claim 16, wherein the multiple patterns include a first pattern for the MSB page, and
the count information includes first count information indicating the number of cells in the first voltage level region, second count information indicating the number of cells in a range of the second to fifth voltage level regions, and third count information indicating the number of cells in a range of the sixth to eighth voltage level regions.

18. The method of claim 16, wherein the multiple patterns include a second pattern for the CSB page, and
the count information includes first count information indicating the number of cells in a range of the first and second voltage level regions, second count information indicating the number of cells in a range of the third and fourth voltage level regions, third count information indicating the number of cells in a range of the fifth and sixth voltage level regions, and fourth count information indicating the number of cells in a range of the seventh and eighth voltage level regions.

19. The method of claim 16, wherein the multiple patterns include a third pattern for the LSB page, and the count information includes first count information indicating the number of cells in a range of the first to third voltage level regions, second count information indicating the number of cells in a range of the fourth to seventh voltage level regions, and third count information indicating the number of cells in the eighth voltage level region.

20. The method of claim 16, wherein the multiple patterns include a first pattern for the MSB page, a second pattern for the CSB page, and a third pattern for the LSB page, and wherein the count information includes:

first information which includes first count information indicating the number of cells in the first voltage level region, second count information indicating the number of cells in a range of the second to fifth voltage level regions, and third count information indicating the number of cells in a range of the sixth to eighth voltage level regions;

second information which includes fourth count information indicating the number of cells in a range of the first and second voltage level regions, fifth count information indicating the number of cells in a range of the third and fourth voltage level regions, sixth count information indicating the number of cells in a range of the fifth and sixth voltage level regions, and seventh count information indicating the number of cells in a range of the seventh and eighth voltage level regions; and third information which includes eighth count information indicating the number of cells in a range of the first to third voltage level regions, ninth count information indicating the number of cells in a range of the fourth to seventh voltage level regions, and tenth count information indicating the number of cells in the eighth voltage level region.

\* \* \* \* \*